June 3, 1958     B. BARÉNYI     2,837,347
FRAME FOR MOTOR VEHICLES
Filed Dec. 3, 1949     4 Sheets-Sheet 1
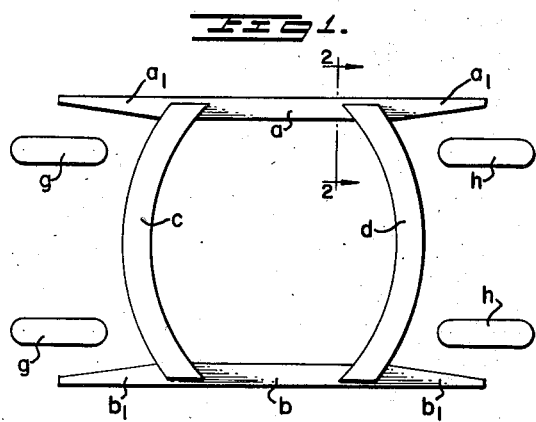
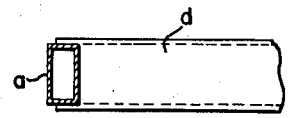
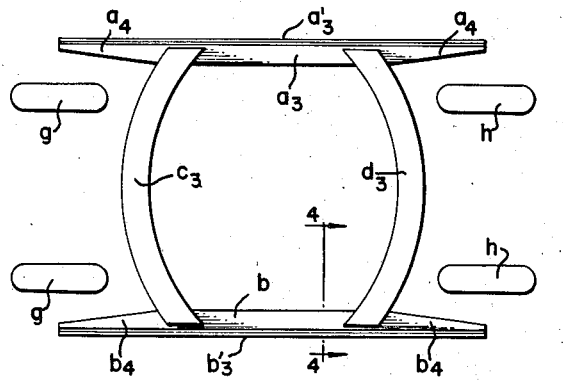
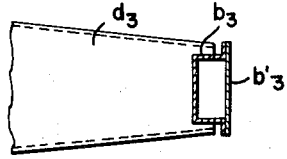

June 3, 1958   B. BARÉNYI   2,837,347
FRAME FOR MOTOR VEHICLES
Filed Dec. 3, 1949   4 Sheets-Sheet 2
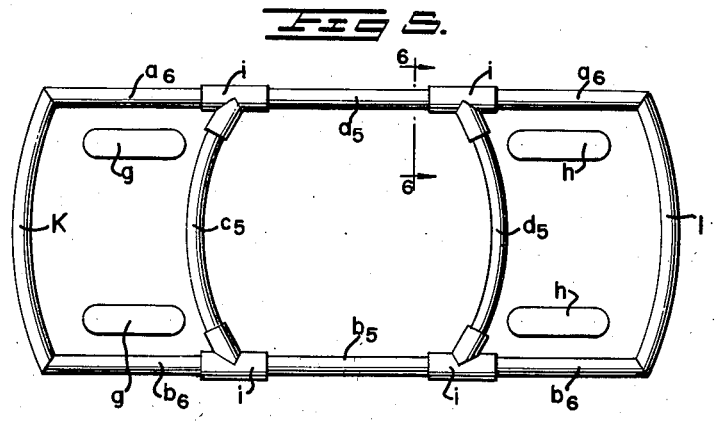
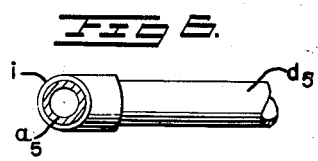
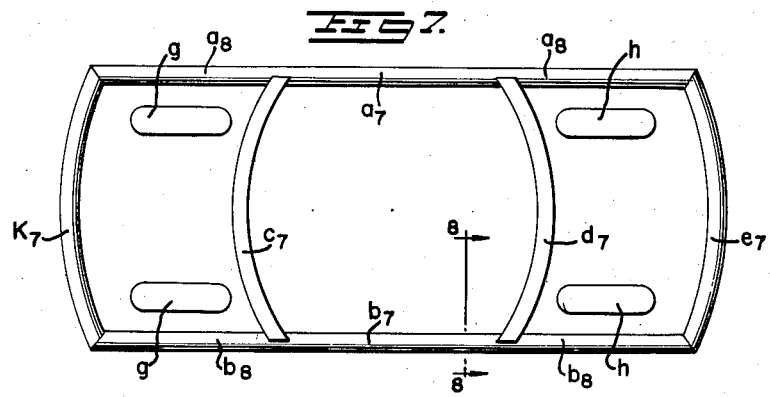
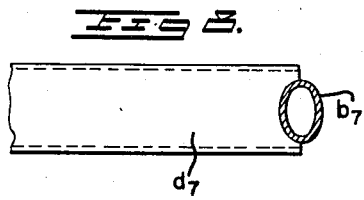

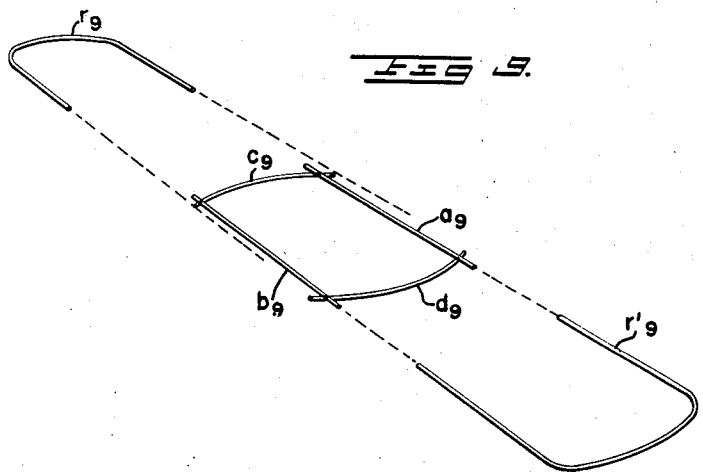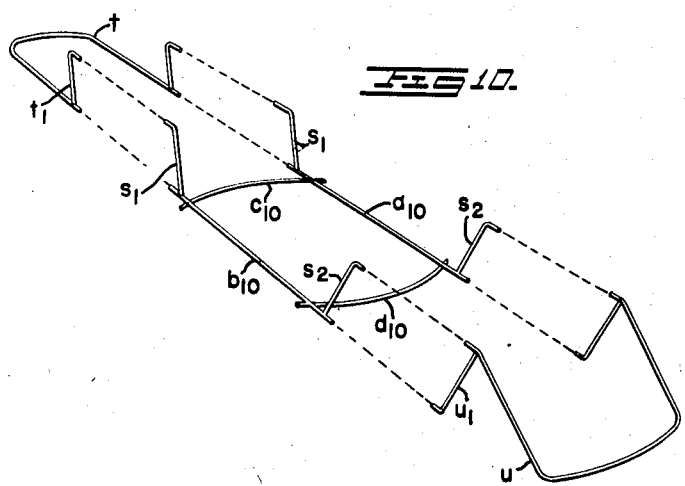

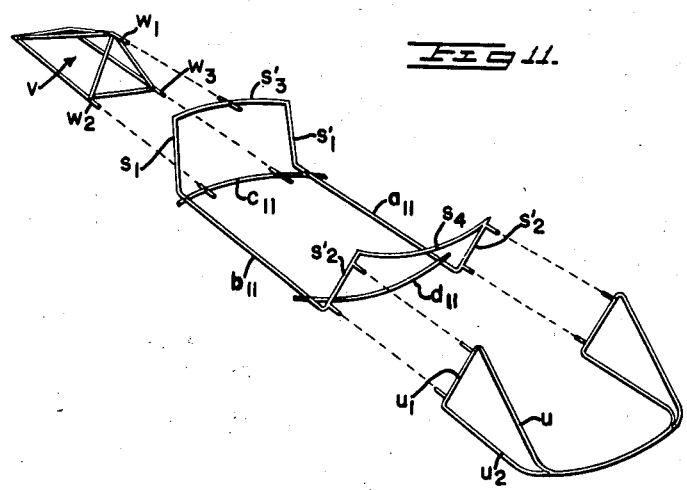
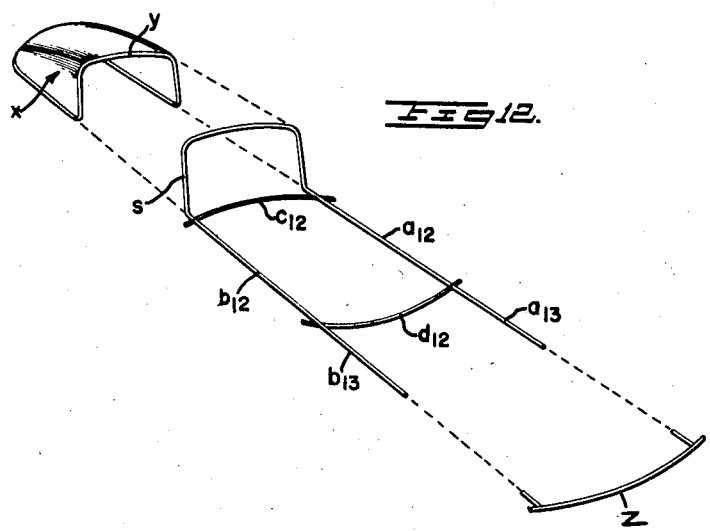

United States Patent Office 2,837,347
Patented June 3, 1958

2,837,347

FRAME FOR MOTOR VEHICLES

Béla Barényi, Stuttgart, Germany

Application December 3, 1949, Serial No. 130,987

Claims priority, application Germany December 6, 1948

11 Claims. (Cl. 280—106)

This invention relates to a frame for motor vehicles.

The main object of this invention is to provide a frame construction having the most favorable conditions relating to space, in particular, for the interior of a passenger car with a low center of gravity. At the same time, it is intended to provide a frame of high strength and low weight with relation to the useful load or the spaciousness of room within the vehicle's interior.

It is a further object of this invention to provide a frame useful as a self-contained frame or as a part of a self-supporting car body.

It is a further object of this invention to provide a particularly light-weight structure primarily comprised of two side members and two cross members for forming a substantially annular framework without further cross members.

It is a still further object of this invention to provide a vehicle frame which may also be provided with forward and rearward extensions and may directly support in each case the whole car body designed as a structural unit, or directly serve only as frame of a central vehicle part to which one or the two vehicle end parts are attached in a so-called cell-type structure.

It is another object of the invention to arrange the side members of the frame a distance from each other which at least corresponds to the wheel track or tread or, preferably, is greater than the wheel tread, in such a manner that the extension of the side members toward the ends of the vehicle enclose the wheels therebetween.

The foregoing and other objects and advantages of the present invention will appear from the following description and appended claims when considered in connection with the accompanying drawings forming part of this specification wherein like reference characters designate corresponding parts in several views.

According to the present invention, several embodiments thereof are illustrated by way of example, more or less diagrammatically in the accompanying drawing, wherein:

Figures 1, 3, 5 and 7 are plan views of four different embodiments of frame constructions in accordance with the present invention;

Figures 2, 4, 6 and 8 are cross-sectional views of the frames shown in Figures 1, 3, 5 and 7, and taken along lines 2—2, 4—4, 6—6, and 8—8 in Figures 1, 3, 5 and 7, respectively, and Figures 9 to 12 are diagrammatic views of different embodiments of the entire frame construction in accordance with the present invention, in particular for vehicles manufactured according to the so-called cell-type structure.

In the various views of the drawing, the side members of the basic frame construction in accordance with the present invention are designated by reference characters $a$ and $b$, while the front and rear cross members are designated by reference characters $c$ and $d$, respectively, appropriate suffixes being used with the reference characters where necessary.

Referring now to Figure 1, the entire frame consists only of the two side members $a$ and $b$ having extensions $a_1$ and $b_1$, respectively, and of the two cross members $c$ and $d$. The side member extensions $a_1$ and $b_1$, according to Figure 1, extend beyond the cross members, for example, approximately up to the axes of the front wheels $g$ and the rear wheels $h$. The side members are arranged at a distance from each other, which is greater than the track or tread of the front wheels $g$ and the rear wheels $h$ and corresponds approximately to the greatest width of the vehicle. The cross members are arched towards the ends of the vehicle and arranged at such a distance from each other that they limit the interior space of the vehicle in front and at the rear thereof. The cross members $c$ and $d$ together with the side members $a$ and $b$ form an annular frame surrounding the entire interior space of the vehicle. In this way, it is possible to provide an uninterrupted continuous floor which, for example, may be plain, vaulted or slightly stepped. The floor, not shown, may in this case form one structural member with the frame. Frame and floor may also form parts of a self-supporting car body.

The car body as a whole may be placed on the frame or may be combined with the latter to form a self-supporting car body. In the application to cell-type structure, the separately manufactured end parts of the vehicle may be secured either to the frame, in particular to the cross members, or to the car body, which is self-supporting in this case.

The extensions $a_1$ and $b_1$ may serve to support thereon the car body or the adjacent vehicle parts.

Figures 3 and 4, which are similar to Figures 1 and 2, illustrate a slightly modified embodiment of a frame construction in accordance with the present invention. The side members of this embodiment are formed by outwardly open hat-shaped channel sections $a_3$ and $b_3$ closed by plate-like members $a'_3$ and $b'_3$ which are connected to flange portions of the respective hat-shaped channel sections $a_3$ and $b_3$ and extend over the entire length of the vehicle frame. The side member extensions $a_4$ and $b_4$ extend again beyond the cross members $c_3$ and $d_3$ whereby the latter are also of hollow box-type cross section with the cross section increasing from both sides toward the vehicle center.

Figures 2 and 4 show that both the side members and cross members of the frames of Figures 1 and 3 have a box-type cross section. However, it is understood that any other type cross section, such as tubular cross section, may be used.

Due to the arched configuration of the cross members, the welded joints at the connections between respective cross and side members extend obliquely to the arched axis of the cross members thereby increasing the strength of the frame and ensuring, conjointly with an advantageous transmission of forces from the cross members to the side members secured thereto at an obtuse angle, a frame construction which is particularly favorable as regards ability to withstand the application of forces thereto.

The embodiments of Figures 5 and 6 show tubular side and cross members with circular cross sections. The side members $a_5$ and $b_5$ are connected with the cross members $c_5$ and $d_5$ by socket joints $i$ which may be welded. The side members $a_5$ and $b_5$, furthermore, have extensions $a_6$ and $b_6$ extending beyond the cross members $c_5$ and $d_5$ up to the forward and rearward ends of the vehicle. The front and rear ends of side extensions $a_6$ and $b_6$ are connected together by means of additional cross members $k$ and $l$, respectively. The front wheels $g$ and rear wheels $h$ are located within the side members which essentially limit the external outline of the vehicle. The cross members $k$ and $l$ are preferably arched, as seen in Figure 5, like cross members $c_5$ and $d_5$, and may have the same or a different cross section as the other cross members $c_5$ and $d_5$.

Figures 7 and 8 disclose a frame generally similar to that shown in Figures 5 and 6 with the exception that the tubular side members $a_7$ and $b_7$ as well as the side member extensions $a_8$ and $b_8$ and cross members $k_7$ and $l_7$ are oval in cross section, while cross members $c_7$ and $d_7$ are butt welded to the side members $a_7$ and $b_7$.

All features of Figures 1 to 8 inclusive may be interchanged with each other or be replaced or completed by other features, for example, corresponding to Figures 9 to 12 which will be described in detail hereinafter.

Figure 9 shows two bow-shaped outer frames $r_9$ and $r'_9$ connected to side members $a_9$ and $b_9$ of the central basic frame. While the side members of the outer frame $r'_9$ are arranged in extension of the side members $a_9$ and $b_9$, they are attached to the outer edges thereof in the case of the outer frame $r_9$. In both cases of Figure 9 in connection with the outer frames $r_9$ and $r'_9$, the cell-type structure is supposed to be applied.

Contrary to the above-described embodiments in which an essentially plane frame is provided, having the different frame parts connected eventually with each other in the plane of the frame, there are illustrated in Figure 10 to Figure 12, inclusive, further embodiments in which the single frames or supporting structures, which are assembled, for example, according to the cell-type structure, form a three-dimensional system.

In the case of Figure 10, the side members $a_{10}$ and $b_{10}$ are provided with upwardly projecting horn-type members $s_1$ and $s_2$. The outer frame $t$ has corresponding horn-type members $t_1$ serving to provide connection with the members $s_1$ of the side members $a_{10}$ and $b_{10}$. The outer frame $u$ differs from the outer frame $t$ only in that its side members extend slantingly upwards towards the parting line between the outer frame and the central basic frame, so that the members $u_1$ extend from the outer frame $u$ slantingly downwards.

In the embodiment according to Figure 11, in the right-hand half thereof, the horn-type members $s'_2$ are propped by a cross member $s_4$ so that a closed inclined frame consisting of members $d_{11}$, $s'_2$, $s_4$ and $s'_2$ is formed which stiffens, for example, a cross wall of the car body. The outer right-hand frame $u$ and $u_1$, illustrated in Figure 10, is stiffened in the embodiment according to Figure 11 in a similar way by additional side members $u_2$.

In the left-hand half of Figure 11, a three-dimensional framework, generally designated by reference character $v$, is provided for the vehicle end part which is connected at three points $w_1$, $w_2$ and $w_3$ to the cross member $c_{11}$ and to the upper cross member $s'_3$, respectively, for example, of the front wall of the car body. The embodiment according to Figure 11 provides a particularly stiff structure for the vehicle car body.

In Figure 12, the frame $s$ is bent up in a perpendicular plane, similarly as in Figure 11, to secure thereon a bonnet, generally designated by reference character $x$, by flanging the latter, for example, along the edge $y$ thereof to the frame $s$. The side members $a_{12}$ and $b_{12}$ have extensions $a_{13}$ and $b_{13}$ beyond the cross member $d_{12}$. A cross member $z$, which, for example, also serves to support thereon the axle system, connects the two extensions $a_{13}$ and $b_{13}$ of the side members to thereby form a closed frame.

In Figures 9 to 12, inclusive, there are illustrated two different frame constructions according to the present invention as applied to the two ends of the same vehicle. However, the vehicle may also be constructed in the same manner at the front and rear end thereof, utilizing the teachings of either one or the other end frame construction, or any desired combination of the various constructional embodiments of Figures 9 to 12 may be provided.

The driving elements are preferably located as a unit comprising the entire driving assembly in one of the end parts of the vehicle, for example, as front wheel drive or as rear engine driving unit so that the central part of the vehicle or the basic frame comprising the two side members $a$ and $b$ and the two cross members $c$ and $d$ are not traversed by any driving elements. The axles are preferably supported in each case on one of the end parts of the frame or of the vehicle and eventually are removable therefrom. Further, the arched cross members $c$ and $d$ are particularly suitable to provide points of application for equipment to be applied from the outside and acting on the frame by external forces, such as traction members, jacks or the like. The point of application of these forces is, for example, in all cases in the middle of the cross member.

The annular frame consisting of the two side members $a$ and $b$ and of the cross members $c$ and $d$ conveniently surrounds the entire interior space of the car body, which, owing to the great distance between the two side members and due to the shaping of the cross members, assures the greatest possible spaciousness of the interior of the car. In the application to the cell-type structure the parting line between the different parts of the vehicle is provided preferably outside the cross members $c$ and $d$, and in particular immediately adjacent the latter or contiguous to the cross wall containing these cross members.

It is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and it is not intended to limit the invention herein claimed beyond the requirements of the prior art.

What I claim is:

1. A frame for a motor vehicle having a car body with a low center of gravity, comprising two straight and parallel side members of hollow section laterally limiting said car body and two cross members of hollow section limiting the interior space of said car body forwardly and rearwardly thereof and connecting said side members together to form a closed frame, said cross members being continuously arched towards the ends of said motor vehicle for providing continuously curved connections between said two side members devoid of any angle between said connections and for forming an essentially quadrangular frame, said side members and said cross members limiting a space within said frame free of side and cross members for providing a continuous uninterrupted space for a floor therein, said side members being provided with extensions projecting up to at least one of the ends of said motor vehicle, and at least one end cross member, said end cross member being continuously arched similarly to one of said cross members towards the corresponding end of said vehicle.

2. A frame for a motor vehicle having a car body with a low center of gravity, comprising two straight and parallel side members of hollow section laterally limiting said car body and two cross members of hollow section lying between the wheel bases of said vehicle limiting the passenger space of said car body forwardly and rearwardly thereof and connecting said side members together for forming a closed frame, said cross members being continuously arched toward the ends of said motor vehicle for providing continuously curved connections between said two side members devoid of any angle between said connections and for forming an essentially quadrangular frame, said side members and said cross members limiting a space within said frame free of any side and cross members for providing a continuous uninterrupted and unobstructed space for a floor therein, and said side members extending beyond said cross members for a considerable distance.

3. In a motor vehicle as set forth in claim 2, wherein the portions of the extensions of said side members extending beyond said cross members form part of bow-shaped outer frames including a transversely extending portion connecting said extensions.

4. In a motor vehicle as set forth in claim 3, wherein said bow-shaped outer frames have upwardly extending slanting side members.

5. In a motor vehicle as set forth in claim 2, further comprising connecting members connecting the respective ends of said side members extending beyond said cross members at each end of said motor vehicle.

6. In a motor vehicle as set forth in claim 2, wherein said side members extending beyond said cross members at least at one end of the vehicle terminate in upwardly projecting horn-type members.

7. In a motor vehicle as set forth in claim 6, further comprising a generally U-shaped outer frame having upwardly extending slanting members corresponding to said horn-type members at one end of said frame and adapted to be connected thereto.

8. In a motor vehicle as set forth in claim 7, further comprising an additional cross member for connecting together said horn-type members at one end of said frame.

9. In a motor vehicle as set forth in claim 2, wherein said frame further comprises an end cross member continuously arched towards the corresponding end of said vehicle and interconnecting the side member extensions at one end thereof, projecting horn-type members connected to the side member extensions on the end of the frame opposite to said end cross member, and a bonnet having upwardly slanting members corresponding to said horn-type members for connection therewith.

10. In a motor vehicle as set forth in claim 9, wherein said horn-type members are connected together at the upper ends thereof by a cross member and said bonnet has a corresponding cross member, and the edges of the last two cross members are connected together for securing said bonnet to said frame.

11. In a motor vehicle as set forth in claim 2, wherein said side members extending beyond said cross members terminate in upwardly projecting horn-type members, and further comprising additional cross members for connecting together the upper ends of said horn-type members at each end of said frame, a truss-like three dimensional frame secured at three points to a frame cross member and a horn-type cross member at one end of said frame, and U-shaped truss-like outer frame secured to the horn-type members at the other end of said frame.

References Cited in the file of this patent

UNITED STATES PATENTS

| | | |
|---|---|---|
| 1,107,042 | Cowles | Aug. 11, 1914 |
| 1,411,875 | Schroeder | Apr. 4, 1922 |
| 1,478,373 | Belden | Dec. 25, 1923 |
| 1,777,966 | Fageol | Oct. 7, 1930 |
| 2,130,066 | Burgh | Sept. 13, 1938 |
| 2,143,666 | Swallow | Jan. 10, 1939 |
| 2,173,525 | Wallace | Sept. 19, 1939 |
| 2,202,859 | Ledwinka | Jan. 4, 1940 |
| 2,301,330 | Schafer | Nov. 10, 1942 |
| 2,344,378 | Wagner | Mar. 14, 1944 |
| 2,551,528 | Darrin | May 1, 1951 |
| 2,552,320 | Huber | May 8, 1951 |
| 2,701,726 | Barenyi | Feb. 8, 1955 |

FOREIGN PATENTS

| | | |
|---|---|---|
| 798,153 | France | Mar. 2, 1936 |
| 376,384 | Great Britain | July 14, 1932 |